(12) United States Patent
Naito

(10) Patent No.: US 6,890,004 B2
(45) Date of Patent: May 10, 2005

(54) COUPLER

(75) Inventor: Keiichirou Naito, Kashiwa (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/631,732

(22) Filed: Aug. 1, 2003

(65) Prior Publication Data
US 2005/0023826 A1 Feb. 3, 2005

(51) Int. Cl.$^7$ ................................................ F16L 35/00
(52) U.S. Cl. ............................ 285/93; 285/314; 285/316
(58) Field of Search ........................................... 285/316

(56) References Cited

U.S. PATENT DOCUMENTS

| | | | | |
|---|---|---|---|---|
| 4,825,893 A | * | 5/1989 | Gailey | 285/316 |
| 5,290,009 A | * | 3/1994 | Heilmann | 285/316 |
| 5,445,358 A | * | 8/1995 | Anderson | 285/316 |
| 5,607,139 A | * | 3/1997 | Kjellberg | 285/316 |
| 6,129,334 A | * | 10/2000 | Kuwabara | 285/316 |
| 6,131,961 A | * | 10/2000 | Heilmann | 285/316 |
| 6,283,443 B1 | * | 9/2001 | Taneya | 285/316 |
| 6,557,904 B2 | * | 5/2003 | Naito | 285/316 |
| 6,568,717 B1 | * | 5/2003 | Le Clinche | 285/316 |
| 6,709,019 B2 | * | 3/2004 | Parrott et al. | 285/316 |

FOREIGN PATENT DOCUMENTS

JP 2001-116178 4/2001

* cited by examiner

Primary Examiner—David Bochna
(74) Attorney, Agent, or Firm—Paul A. Guss

(57) ABSTRACT

A coupler includes a first joint member, a holder, a second joint member, a sleeve, and a valve. The holder is attached to an outer circumference of the first joint member. The second joint member is detachably attached to the holder. The sleeve covers an outer circumferential surface of the holder and is displaceable by a first spring member. The valve is attached into the first joint member and changes the communication in the first joint member.

10 Claims, 5 Drawing Sheets

US 6,890,004 B2

COUPLER

BACKGROUND OF THE INVENTION

1. Field of the Invention

The present invention relates to a coupler for opening/closing a flow passage by connecting or separating a socket and a plug. In particular, the present invention relates to a coupler provided with an indicating function for indicating the attachment of a plug to a socket.

2. Description of the Related Art

A coupler has been hitherto adopted in order to automatically open/close a flow passage when a plug is connected to a socket or when the plug is separated from the socket. A valve plug is automatically opened/closed by the coupler. Therefore, the flow passage is closed when the plug is separated from the socket. Accordingly, the fluid is prevented from leaking.

In a conventional coupler, an operator observes the coupler to confirm whether or not the plug is reliably attached to the socket. However, when the attachment is checked by visual observation only, it is extremely difficult to find out whether the attachment of the plug to the socket is incomplete. As a result, if the plug is incompletely attached to the socket, the fluid does not flow from the pipe connected with the socket to the pipe connected with the plug.

Alternatively, an operator may directly touch the socket and the plug of each coupler to confirm the attachment. However, when a plurality of couplers are provided, the confirmation by directly touching the couplers is complicated. The maintenance operation is also complicated.

SUMMARY OF THE INVENTION

A general object of the present invention is to provide a coupler which makes it possible to easily confirm whether a second joint member is attached or detached by exposing only a part of an outer circumferential surface of a holder when the second joint member is supposed to be connected with the holder.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
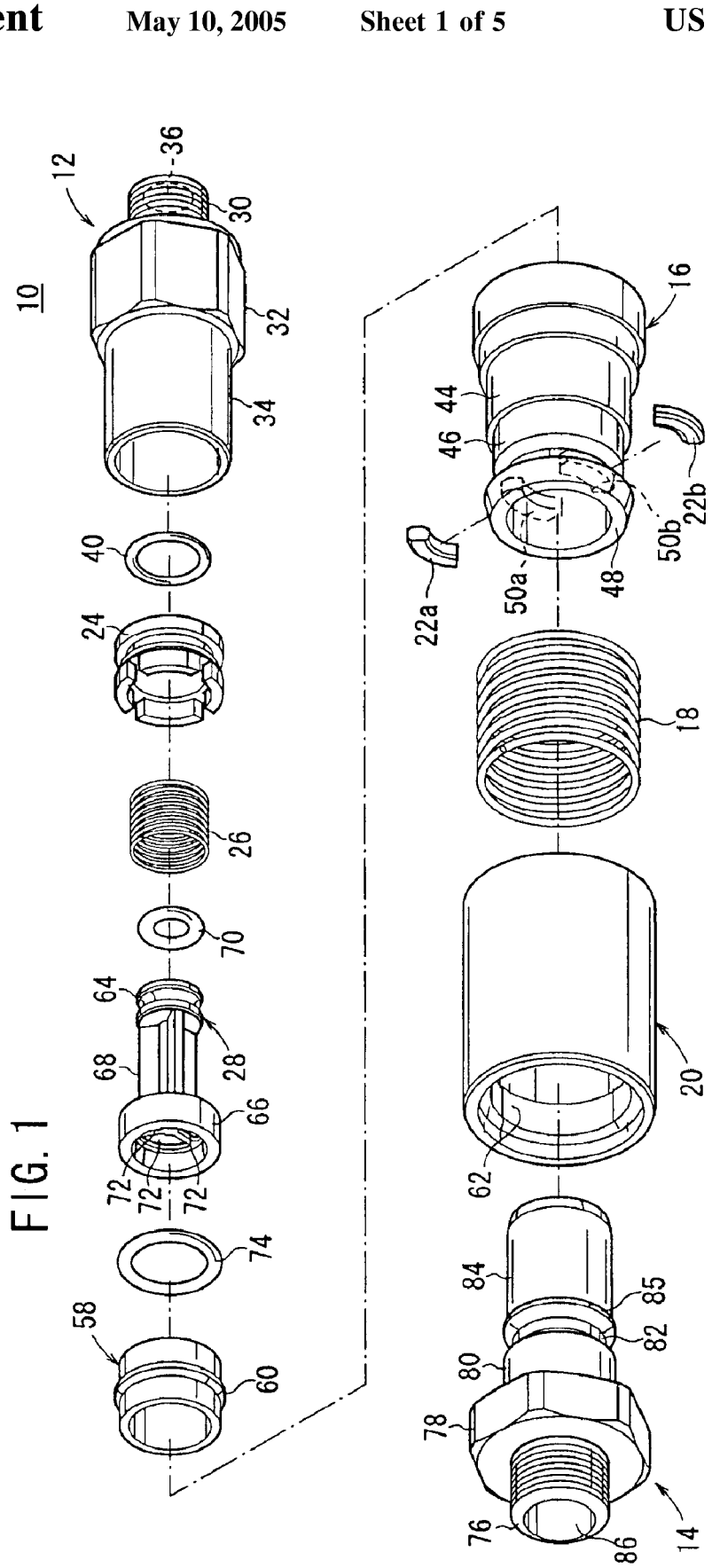
FIG. 1 is an exploded perspective view illustrating a coupler according to an embodiment of the present invention.
Figure 2:
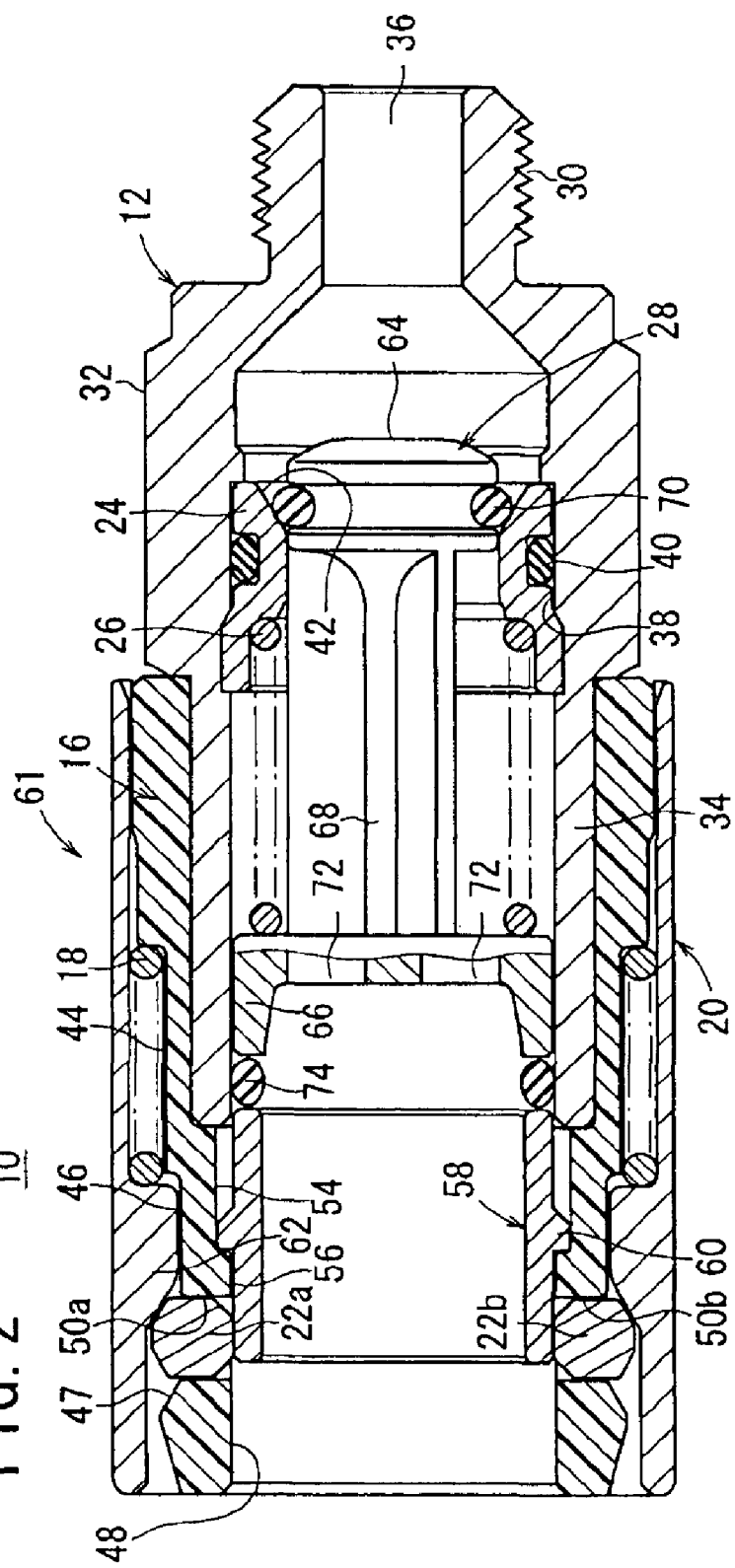
FIG. 2 is a longitudinal sectional view taken in the axial direction, illustrating a state in which a second joint member is detached from the coupler.
Figure 3:
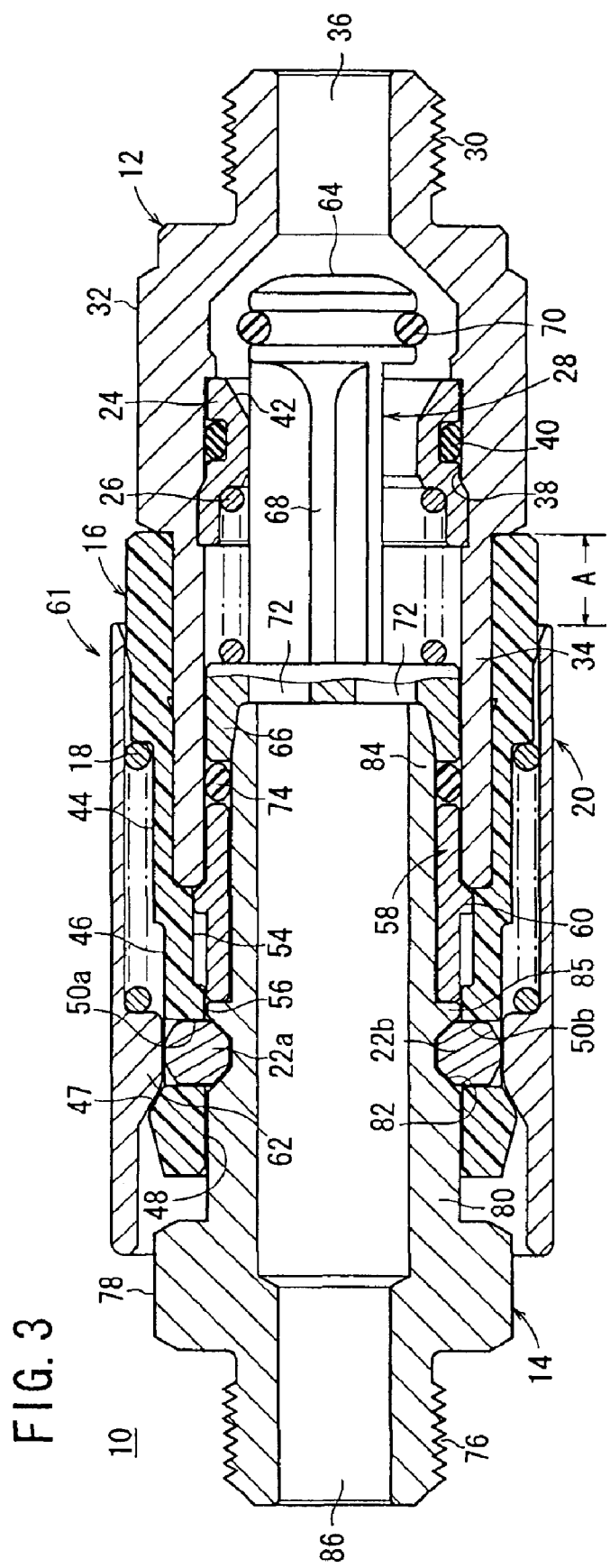
FIG. 3 is a longitudinal sectional view taken in the axial direction, illustrating a state in which the second joint member is attached to the coupler.

In FIGS. 1 to 3, reference numeral 10 indicates a coupler according to an embodiment of the present invention. An explanation will now be made with reference to FIG. 3 about a state in which a first joint member 12 and a second joint member 14 are attached in an integrated manner.

The coupler 10 comprises a first joint member 12 made of a metal material and arranged on one side in the axial direction, a second joint member 14 arranged on the other side and disposed opposingly to the first joint member 12, a holder 16 connected with the second joint member 14 at a position deviated toward the second joint member 14 from the center of the first joint member 12, and a sleeve 20 surrounding the outer circumferential surface of the holder 16 and provided displaceably in the axial direction by the spring force of a first spring member 18 interposed between the holder 16 and the sleeve 20.

The coupler 10 has fastening members 22a, 22b inserted into engagement holes 50a, 50b of the holder 16 as described later on, a holding member 24 attached into the first joint member 12, and a valve 28 urged toward the first joint member 12 by the spring force of a second spring member 26 inserted into the holder 16.

As shown in FIGS. 2 and 3, the first joint member 12 has a first connecting section 30 formed on one end of the first joint member 12 and connected to an unillustrated pipe or the like, a hexagonal cylindrical first tightening section 32 provided at a position adjacent to the first connecting section 30, and a first guide section 34 formed on the other end of the first joint member 12 and having a reduced diameter as compared with the first tightening section 32 to extend by a predetermined length in the axial direction.

The first joint member 12 has a first port 36 formed in the first connecting section 30. A first stepped section 38 having a diameter widened as compared with the first port 36 is formed in the first tightening section 32. The holding member 24 having an outer circumferential surface corresponding to the stepped shape of the first stepped section 38 is attached to the first stepped section 38. A first seal member 40 is attached to an annular groove on the outer circumferential surface of the holding member 24 to maintain air tightness between the first joint member 12 and the holding member 24.

A tapered valve seat 42 having gradually increasing diameters is formed on the inner circumferential surface of the holding member 24 near the first port 36. A second spring member 26 is interposed between a groove on the inner circumferential surface of the holding member 24 near the second joint member 14 and a sliding section 66 of the valve 28 as described later on. The inner circumferential surface of the first guide section 34 and the outer circumferential surface of the sliding section 66 are formed to have substantially the same diameter.

One end of the holder 16 formed of a resin material is inserted onto the outer circumferential surface of the first guide section 34. The one end of the holder 16 abuts against the end surface of the first tightening section 32.

A second stepped section 44 having a reduced diameter compared with a portion near the first joint member 12 is formed on the outer circumferential surface of the holder 16. The spring member 18 is provided between the sleeve 20 and the second stepped section 44. Further, a third stepped section 46 having a reduced diameter as compared with the second stepped section 44 is formed on the outer circumferential surface of the holder 16 near the second joint member 14. A tapered inclined section 47 having an outer circumferential surface expanded radially outwardly is formed at the other end of the holder 16. An opening 48 is formed inside of the holder 16. A pair of engagement holes 50a, 50b, each of which has a substantially arc-shaped cross section, are formed between the third stepped section 46 and the opening 48 (see FIG. 1). The engagement holes 50a, 50b are positioned substantially symmetrical with respect to the axis of the holder 16. The pair of fastening members 22a, 22b are attached to the engagement holes 50a, 50b respectively. Each of the fastening members 22a, 22b has a substantially arc-shaped cross section when taken circumferentially, corresponding to the shape of each of the engagement holes 50a, 50b and has a substantially octagonal cross section when taken radially.

As shown in FIG. 3, a fourth stepped section 54 is formed on the inner circumferential surface of the holder 16. The fourth stepped section 54 has a reduced diameter as compared with the inner circumferential surface onto which the first guide section 34 is inserted. Further, a fifth stepped section 56 having a further reduced diameter is formed on the inner circumferential surface of the holder 16.

An annular projection 60 of a collar member 58 formed to have a substantially T-shaped cross section is engaged with the fourth stepped section 54. The collar member 58 is displaceable along the fourth stepped section 54 on the annular projection 60. In order to be easily recognized from the outside, the outer circumferential surface of the holder 16 is preferably colored, for example, in red or orange.

An indicating mechanism 61 is provided on the outer circumference of the first guide section 34 for covering or exposing the outer circumferential surface of the holder 16 by displacing the sleeve 20 on the outer circumference of the holder 16 with the first spring member 18.

The sleeve 20 has a substantially identical outer diameter in the axial direction. A projection 62 protruding radially inwardly is formed on the inner circumferential surface of the sleeve 20. The projection 62 is engaged with the third stepped section 46. The first spring member 18 is interposed between the projection 62 and the second stepped section 44. The first spring member 18 urges the sleeve 20 in the direction to separate from the holder 16. The inner circumferential surface of the projection 62 and the outer circumferential surface of the third stepped section 46 have substantially identical diameters. The projection 62 slides along the outer circumferential surface of the third stepped section 46.

The valve 28 comprises a valve plug 64 arranged in the first joint member 12 and having a substantially circular shape on one end, a sliding section 66 inserted slidably onto the inner circumferential surface of the first guide section 34 on the other end, and a plurality of flange sections 68 which connect the valve plug 64 and the sliding section 66 and which are circumferentially separated from each other by predetermined angles (see FIG. 1).

A second seal member 70 is attached to an annular groove on the outer circumferential surface of the valve plug 64. The second seal member 70 is air-tightly pressed against the tapered valve seat 42 of the holding member 24 by the spring force of the second spring member 26 attached to the sliding section 66.

A plurality of communication holes 72 are formed on one end surface of the flange section 68 of the sliding section 66. When the valve 28 is opened, the first port 36 communicates with a second port 86 of the second joint member 14 as described later on, via the communication holes 72.

A third seal member 74 is interposed between one end surface of the sliding section 66 and one end surface of the collar member 58. The third seal member 74 is displaced together with the collar member 58 when the valve 28 is displaced.

The second joint member 14 comprises a second connecting section 76 arranged coaxially with the first joint member 12 and connecting to an unillustrated pipe or the like, a hexagonal cylindrical second tightening section 78 provided at a position adjacent to the second connecting section 76, a second guide section 80 having a reduced diameter as compared with the second tightening section 78 and extending by a predetermined length, an engaging groove 82 with which the fastening members 22a, 22b are engaged on the outer circumferential surface of the second guide section 80, a third guide section 84 having a reduced diameter as compared with the second guide section 80 and extending by a predetermined length, and a projection 85 formed between the engaging groove 82 and the third guide section 84.

The shape of the engaging groove 82 corresponds to the shapes of the fastening members 22a, 22b to be engaged therewith.

The outer diameter of the second guide section 80 is substantially equivalent to the inner diameter of the opening 48. The outer diameter of the third guide section 84 is substantially identical with the inner diameter of the collar member 58.

The collar member 58 abuts against the outer circumferential surface of the third guide section 84. The tapered end of the third guide section 84 corresponds to the tapered shape of the inner circumferential surface of the sliding section 66. The second port 86 is formed in the second connecting section 76 on one end of the second joint member 14. A through-hole communicated with the second port 86 is formed on the other end of the second joint member 14.

The coupler 10 according to the embodiment of the present invention is basically constructed as described above. Next, its operation, function, and effect will be explained. The explanation starts from an initial state in which the second joint member 14 is detached as shown in FIG. 2.

As shown in FIG. 2, the sleeve 20 is urged in the direction to separate from the holder 16 by the spring force of the first spring member 18 in the initial state of the coupler 10. The inclined surface of the projection 62 of the sleeve 20 abuts against the inclined surfaces of the fastening members 22a, 22b attached to the engagement holes 50a, 50b. The length of the outer circumferential surface of the sleeve 20 in the axial direction is substantially the same as the length of the holder 16 in the axial direction. Accordingly, in the initial state in which the second joint member 14 is not connected to the first joint member 12, the entire outer circumferential surface of the holder 16 is covered with the sleeve 20, and is not visually recognizable.

The valve 28 is urged in the direction to separate from the holding member 24 by the spring force of the second spring member 26. The second seal member 70 attached to the valve plug 64 abuts against the valve seat 42. The first port 36 is air-tightly sealed. Accordingly, the fluid supplied from the unillustrated pipe or the like connected by the first connecting section 30 is prevented from leaking even when the second joint member 14 is not connected.

When the second seal member 70 attached to the valve plug 64 abuts against the valve seat 42, one end of the sliding section 66 presses the third seal member 74 and the collar member 58 toward the opening 48. The annular projection 60 abuts against the end surface of the fourth stepped section 54.

The fastening members 22a, 22b are attached to the engagement holes 50a, 50b. The outer circumferential surfaces of the fastening members 22a, 22b are retained by the inner circumferential surface of the sleeve 20 and the inner circumferential surfaces of the fastening members 22a, 22b are retained by the outer circumferential surface of the collar member 58. Therefore, the fastening members 22a, 22b are not detached from the engagement holes 50a, 50b.

Next, when the second joint member 14 connected with the unillustrated pipe is inserted into the opening 48 of the holder 16, the tapered end of the third guide section 84 is engaged with the tapered inner circumferential surface of the sliding section 66 to press the valve 28 as shown in FIG. 3. The projection 85 of the second joint member 14 abuts against the end surface of the collar member 58 to press one end surface of the sliding section 66 with the third seal member 74.

As a result, the valve 28 is pressed toward the first joint member 12 against the spring force of the second spring member 26. The displacement amount of the collar member 58 is regulated by the abutment of the annular projection 60 engaged with the fourth stepped section 54 against the end surface of the first guide section 34.

When the second seal member 70 of the valve plug 64 is separated from the valve seat 42, the first port 36 is communicated with the second port 86 via the communication holes 72 of the valve 28.

The fastening members 22a, 22b retained by the outer circumferential surface of the collar member 58 are released by displacing the collar member 58 with the second joint member 14. The fastening members 22a, 22b are displaced inwardly, and inserted into the engaging groove 82 of the second guide section 80.

As a result, the projection 62 of the sleeve 20 fastened by the fastening members 22a, 22b in the initial state is released. The projection 62 of the sleeve 20 moves over the fastening members 22a, 22b by the spring force of the first spring member 18 to be displaced toward the second joint member 14. The projection 62 abuts against the inclined section 47 formed on the outer circumference of the opening 48.

As described above, in the embodiment of the present invention, when the sleeve 20 covering the outer circumferential surface of the holder 16 is displaced toward the second joint member 14, a part of the outer circumferential surface on one end of the holder 16 is exposed (see Portion A in FIG. 3). Accordingly, the attachment/detachment state can be visually recognized with ease from the outside when the second joint member 14 is attached or detached. As a result, it is unnecessary to perform any complicated operation to confirm whether the second joint member 14 is attached or not. Further, it is possible to perform maintenance more conveniently.

The fastening members 22a, 22b are attached to the engaging groove 82. Therefore, the second joint member 14 is prevented from detaching in the axial direction.

When the outer circumferential surface of the holder 16 is colored, it is possible to further improve visual recognizability.

Figure 4:
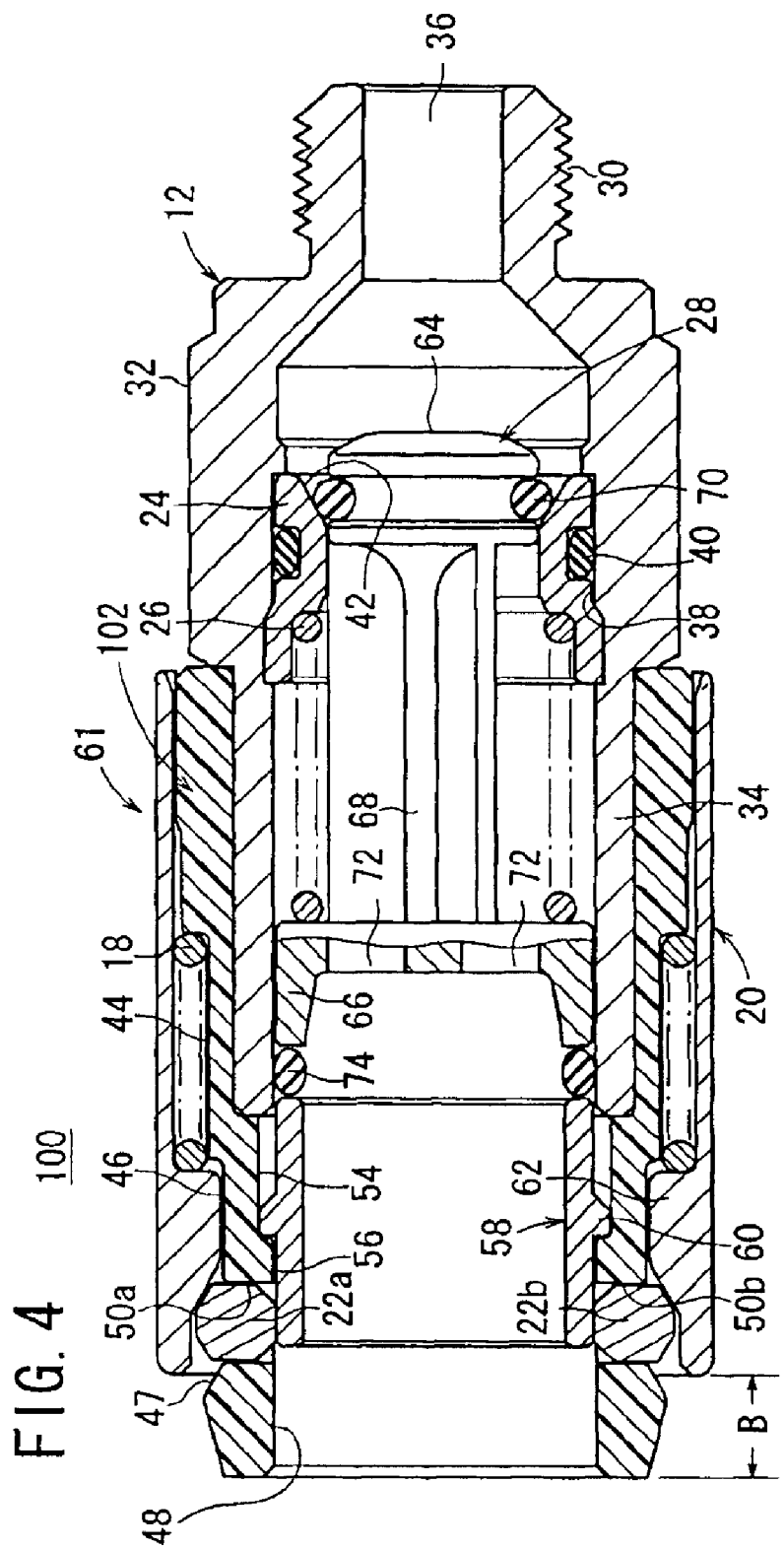
FIG. 4 is a longitudinal sectional view taken in the axial direction, illustrating a state in which a second joint member is detached from a coupler according to another embodiment.
Figure 5:
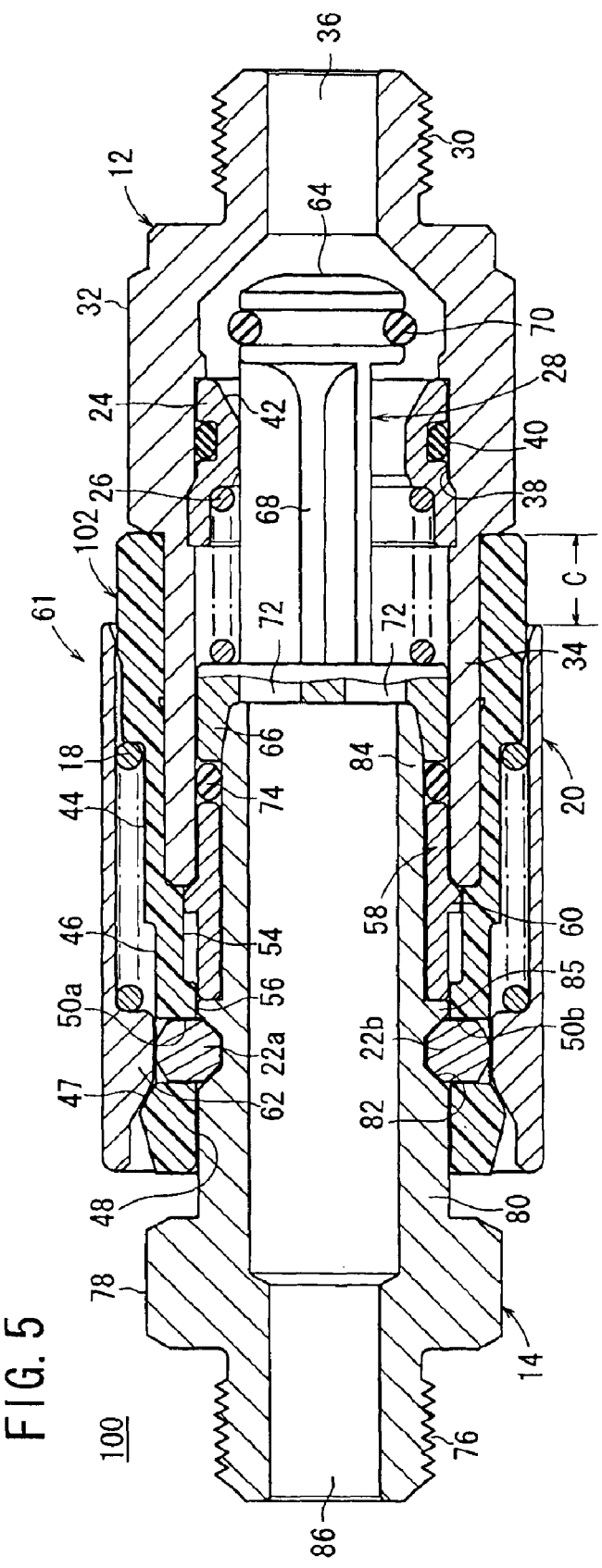
FIG. 5 is a longitudinal sectional view taken in the axial direction, illustrating a state in which the second joint member is attached to the coupler according to the other embodiment.

Next, a coupler 100 according to another embodiment is shown in FIGS. 4 and 5. The components same as those of the coupler 10 according to the embodiment of the present invention described above are designated by the same reference numerals, and detailed explanation thereof will be omitted.

The coupler 100 according to the another embodiment is different from the coupler 10 according to the embodiment of the present invention in that one end of a holder 102 (see Portion B in FIG. 4) is exposed when the second joint member 14 is detached, and the other end of the holder 102 (see Portion C in FIG. 5) is exposed when the second joint member 14 is attached.

As shown in FIG. 4, the one end of the holder 102 (see Portion B in FIG. 4) having the opening 48 is exposed by a predetermined length when the second joint member 14 is detached from the holder 102. Therefore, the detached state of the second joint member 14 can be visually recognized with ease from the outside. In this situation, the outer circumferential surface on the other end of the holder 102 cannot be seen from the outside, because the other end is covered with the sleeve 20.

As shown in FIG. 5, the coupler 100 is formed such that the end surface of the sleeve 20 near the second joint member 14 and the end surface of the opening 48 are aligned in a substantially identical plane when the second joint member 14 is attached. The other end of the holder 102 is exposed to the outside by a predetermined length from the sleeve 20 in the same manner as in the embodiment of the present invention, and hence the attachment can be visually recognized with ease from the outside.

As described above, in the other embodiment, the exposed portion of the outer circumferential surface of the holder 102 is changed from one end (see Portion B in FIG. 4) to the other end (see Portion C in FIG. 5) of the holder 102, depending on whether the second joint member 14 is attached or detached. Therefore, the attached state or the detached state of the second joint member 14 can be visually recognized with ease.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A coupler comprising:
a first joint member;
a holder connected to said first joint member;
a second joint member detachably attached to said holder; and
an indicating mechanism provided on said holder to indicate whether said second joint member is attached to said holder or said second joint member is detached from said holder,
wherein said indicating mechanism comprises a sleeve covering an outer circumferential surface of said holder and a first spring member interposed between said sleeve and said holder, such that said outer circumferential surface of said holder is substantially completely covered by said sleeve and not exposed when said second joint member is detached from said holder, and said sleeve is displaced in an axial direction so that a part of said outer circumferential surface of said holder is exposed and visually recognizable when said second joint member is attached to said holder, and
wherein said first spring member is covered by said sleeve such that said first spring member is not exposed when said joint member is either attached to or detached from said holder.

2. The coupler according to claim 1, further comprising:
a fastening member attached to an engagement hole of said holder,
wherein said sleeve is released by said fastening member when said second joint member is attached to said holder, and said sleeve is displaced in said axial direction by a spring force of said first spring member to expose said part of said outer circumferential surface of said holder.

3. The coupler according to claim 2, wherein said fastening member is retained by a collar member attached to an inner circumferential surface of said holder when said second joint member is released, said fastening member is released by displacing said collar member when said second joint member is attached to said holder, and said fastening member is engaged with an engaging groove of said second joint member so that said first joint member and said second joint member are connected to one another.

4. The coupler according to claim 2, wherein the exposed outer circumferential surface of said holder is colored.

5. The coupler according to claim 1, further comprising a valve plug inserted into said holder displaceably in said axial direction and in contact with a valve seat in said first joint member by a second spring member when maid second joint member is detached,
wherein said valve plug is pressed by said second joint member and separated from said valve seat to communicate first joint member with said second joint member when said second joint member is attached to said holder.

6. A coupler comprising:
a first joint member;
a holder connected to said first joint member;
a second joint member detachably attached to said holder; and
an indicating mechanism provided on said holder to indicate that said second joint member is attached to said holder and that said second joint member is detached from said holder,
wherein said indicating mechanism comprises a sleeve covering an outer circumferential surface of said holder, and a first spring member interposed between said sleeve and said holder,
wherein said sleeve is displaced in an axial direction so that a part of said outer circumferential surface on one end of said holder is exposed and visually recognizable when said second joint member is attached to said holder and another part of said outer circumferential surface on another end of said holder is exposed and visually recognizable when said second joint member is detached from said holder, such that said outer circumferential surface on said one end of said holder is substantially completely covered by said sleeve and not exposed when said second joint member is detached from said holder, and
wherein said first spring member is covered by said sleeve such that said first spring member is not exposed when said joint member is either attached to or detached from said holder.

7. The coupler according to claim 6, further comprising
a fastening member attached to an engagement hole of said holder,
wherein said sleeve is released by said fastening member when said second joint member is attached to said holder, and said sleeve is displaced in said axial direction by a spring force of said first spring member to expose said part of said outer circumferential surface of said holder.

8. The coupler according to claim 7, wherein said fastening member is retained by a collar member attached to an inner circumferential surface of said holder when said second joint member is released, said fastening member is released by displacing said collar member when said second joint member is attached to said holder, and said fastening member is engaged with an engaging groove of said second joint member so that said first joint member and said second joint member are connected to one another.

9. The coupler according to claim 7, wherein the exposed outer circumferential surface of said holder is colored.

10. The coupler according to claim 6, further comprising a valve plug inserted into said holder displaceably in said axial direction and in contact with a valve seat in said first joint member by a second spring member when said second joint member is detached,
wherein said valve plug is pressed by said second joint member and separated from said valve seat to communicate first joint member with said second joint member when said second joint member is attached to said holder.

* * * * *